United States Patent [19]

Sagae et al.

[11] 4,350,989

[45] Sep. 21, 1982

[54] INK-JET PRINTING APPARATUS

[75] Inventors: Syoji Sagae, Hitachiota; Yasumasa Matsuda, Hitachi; Masatoshi Kasahara, Hitachi; Masayoshi Suzuki, Hitachi, all of Japan

[73] Assignees: Hitachi, Ltd.; Hitachi Koki Co., Ltd., both of Tokyo, Japan

[21] Appl. No.: 130,188

[22] Filed: Mar. 13, 1980

[30] Foreign Application Priority Data

Mar. 19, 1979 [JP] Japan .................................. 54/31133

[51] Int. Cl.³ .............................................. G01D 15/16

[52] U.S. Cl. .................................................. 346/140 R

[58] Field of Search .................................. 346/140, 75

[56] References Cited

U.S. PATENT DOCUMENTS

| | | | |
|---|---|---|---|
| 3,560,641 | 2/1971 | Taylor | 346/75 X |
| 3,946,398 | 3/1976 | Kyser | 346/140 R X |
| 4,126,867 | 11/1978 | Stevenson | 346/140 X |
| 4,161,670 | 7/1979 | Kern | 346/140 R X |
| 4,189,734 | 2/1980 | Kyser | 346/140 R X |

*Primary Examiner*—Joseph W. Hartary
*Attorney, Agent, or Firm*—Craig and Antonelli

[57] ABSTRACT

An ink-jet printing apparatus having a plurality of nozzles for projecting ink droplets which are selectively deposited on a printing medium in accordance with an information signal so as to form a printed pattern, such ink-jet printing apparatus comprising means for causing ink droplets used for printing to project from each nozzle in accordance with an information signal, a common power source for supplying a desired voltage to the ink-drop forming means provided at each nozzle thereby operating them, and switching means connected between the ink-drop forming means and the common power source and controlled by the information signal, the output of the power source being selectively supplied through the switching means to the ink-drop forming means, so that the driving system for driving the ink-drop forming means and the control system therefor can be separately provided, thus enabling a number of nozzles to be effectively controlled by a lowest control voltage.

4 Claims, 13 Drawing Figures

INK-JET PRINTING APPARATUS

BACKGROUND OF THE INVENTION

The present invention relates to ink-jet printing apparatus and particularly to an ink-jet printing apparatus adapted to project ink droplets from a plurality of nozzles onto a recording medium and thereby to print or record a picture or characters thereon in accordance with an information signal.

There have been proposed and practically used various types of ink-jet printing apparatus for recording information on a recording medium by ejecting ink droplets from a nozzle to which ink is supplied from an ink reservoir.

One type of such apparatus has an electromechanical transducer (hereinafter referred to simply as electrostrictive element) mounted on the nozzle to which ink is supplied, this electrostrictive element being supplied with a high-frequency voltage so as to vibrate the nozzle. The nozzle projects from its tip end ink drops responsive to the period of the vibration and the ejected ink drops are charged in synchronism with the injection timing thereof. The charged ink drops are deflected in accordance with the amount of charge thereon to form a record pattern on a recording medium (this is commonly called the charge modulation system).

Another type of the apparatus is arranged such that, for example as disclosed in U.S. Pat. No. 3,946,398 entitled "Method and Apparatus for Recording with Writing Fluids and Drop Projection Means therefor", the recording apparatus comprises an ink chamber, or a pressure chamber to which ink is supplied from an ink reservoir, an electrostrictive element, or pressure plate provided on the pressure chamber, and a nozzle head, or a printing head having an orifice which communicates with the pressure chamber so as to eject ink drops therefrom, and that the electrostrictive element, or pressure plate, when supplied with an information signal, changes the volume of the ink chamber, or pressure chamber and displaces the ink responsive to the information signal, thereby causing ink droplets to project from the orifice at the rate of one drop for each pulse of the information signal and to form a desired record pattern on a recording medium (this is called the pulse-jet system).

In these conventional types of the apparatus, the former type in which ink drops are projected from a nozzle in synchronism with the period of nozzle excitation charges each of the ink drops used for recording in accordance with the information signal at the time of separation of the ink drop from the nozzle. Therefore, this apparatus can print or record at a high speed, but requires measures for preventing the ink from changing its physical characteristics and an additional device for collecting unrequired ink drops which have not been used for recording.

On the other hand, in the latter type, each information pulse signal is supplied only when an ink drop recording is required and the nozzle orifice projects the ink drops at the rate of one drop for each information pulse signal. Therefore, its recording speed is lower than that of the charge modulation system but this type of system is advantageous in that its nozzle head is simplified in construction and it does not require any measures for collecting unnecessary ink drops and for deflecting the ink drops, with the result that the whole apparatus is made small in size. This type of system is attractive as a simple ink-jet printing apparatus.

In a practical apparatus of this pulse-jet system, a plurality of ink chambers are generally provided in parallel in a single nozzle head and driven individually. Thus, electric pulses of information are amplified by amplifying means which are connected to the respective electrostrictive elements provided correspondingly to the ink chambers, respectively, and then applied to the electrostrictive elements.

Specifically, as disclosed in Japanese patent application laid-open no. 55237/76, a given number of amplifiers each comprising resistors, capacitors and transistors are connected to the electrostrictive elements which are provided at the respective ink chambers formed by pressure chambers, and supply outputs to drive the corresponding electrostrictive elements. In addition, another method is known in which the outputs from a pulse generator are amplified by amplifiers the number of which corresponds to that of the ink chambers and then supplied to the primary sides of pulse transformers whose secondary sides are connected to the respective ink chambers.

Thus, in such conventional types of apparatus, the pulse signal voltages used to drive the electrostrictive elements provided at the respective ink chambers are as high as 250 to 300 volts with pulse width of about 50 $\mu$s and therefore amplifiers and pulse transformers are necessary in order to obtain drive voltages for the electrostrictive elements.

Further, the components used in the driving circuits for the electrostrictive elements are required to have a high breakdown voltage and the driving circuits are large-sized and complicated. In addition, the outputs of the amplifiers used must be adjusted to be constant and thus much labor is required.

Then the present inventors have studied another charge modulation system having a plurality of nozzles in which the output of an information signal source and the output of a signal distributor driven by a clock signal are used to deliver output signals from amplifiers in a time sharing mode to the respective nozzles which are connected to the amplifiers, so that the circuit arrangement can be simplified.

This circuit arrangement, however, has disadvantages in that it requires a special signal distributor for distributing the outputs of the amplifiers to the nozzles and it is also unable to drive the nozzles simultaneously or drive each of the nozzles at any desired time, because the nozzles must be operated in a predetermined order.

SUMMARY OF THE INVENTION

In view of such aspects of the conventional types of apparatus, it is an object of the present invention to provide an apparatus in which means are provided for driving a plurality of nozzles to project ink droplets for recording or printing and a power circuit for supplying drive voltages to the driving means is controlled by a smaller control voltage so as to effectively control the plurality of nozzles.

It is another object of the present invention to provide an apparatus in which means are provided for driving a plurality of nozzles mounted to a single nozzle head to project ink droplets, the driving means being connected through a switching means to a common electric power source, and the condition of this switching means is controlled according to an information signal thereby to selectively supply the output of the electric power source to the driving means so that the driving circuits can be simplified to enable provision of a small-sized and easily adjustable printing apparatus.

The apparatus according to the present invention comprises a plurality of nozzles from which ink drops are projected, means for selectively projecting from the nozzles ink drops for recording in response to an information signal, a common electric power source for supplying a desired voltage to the ink-drop projecting means and switching means interposed between the ink-drop projecting means and the electric power source, whereby the output of the common electric power source is controlled to interrupt by a small control voltage through the switching means, thereby effectively controlling the ink-drop projection by the nozzles.

DETAILED DESCRIPTION OF THE PREFERRED EMBODIMENTS

The present invention will hereinafter be described with reference to the accompanying drawings showing some embodiments.

Figure 1A:
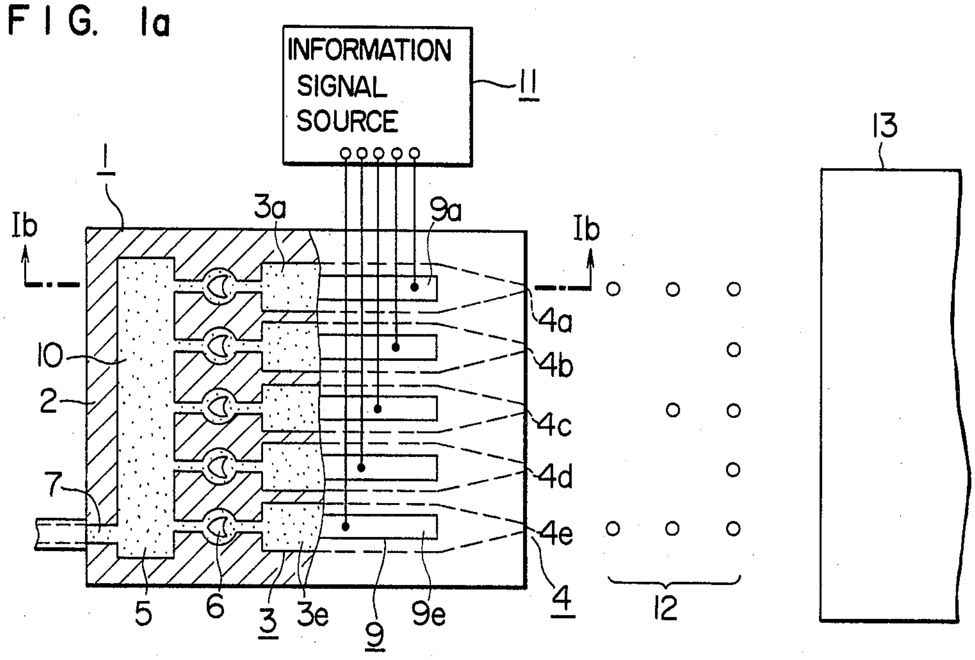
FIG. 1*a* is a plan view of a schematical construction of a nozzle head in one embodiment of the present invention.

In FIG. 1*a*, which is a partially cut-away plan view of a nozzle head in one embodiment of the apparatus according to the present invention, there is shown a nozzle head 1 including a base board 2 on which is formed an ink chamber 3 defining five pressure chambers 3*a* to 3*e*, orifices 4 (4*a* to 4*e*) provided at end surfaces of each ink chamber 3 and which communicate with the respective pressure chambers, a common ink reservoir 5 and passages of fluid diodes 6 between the common ink reservoir 5 and the respective ink chambers 3. Shown at 7 is an ink supply tube for feeding ink from an ink storage (not shown) to the common ink reservoir 5.

Figure 1B:
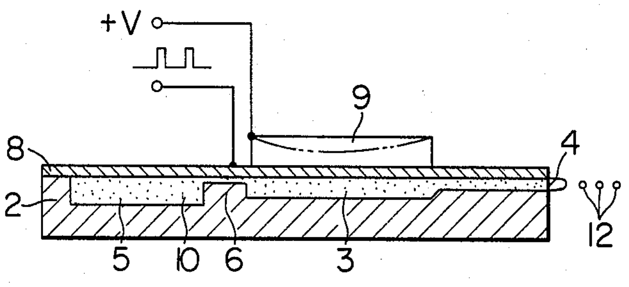
FIG. 1*b* is its cross-sectional view taken along the line *Ib*—*Ib* in FIG. 1*a*.

Onto the base board 2 thus formed is mounted a top lid 8, as shown in FIG. 1*b*, by, for example, electrostatic adhesion technique. In addition, electrostrictive elements 9*a* to 9*e* are secured by adhesive onto the lid 8 to oppose the respective pressure chambers 3*a* to 3*e*.

Moreover, ink 10 is fed from the ink supply tube 7 to the ink chamber 3 through the common ink reservoir 5 and fluid diodes 6*a* to 6*e* so that the ink chamber 3 and the passages to the orifices 4*a* to 4*e* are filed with the ink 10.

When a drive signal is applied to each electrostrictive element 9 from an information signal source 11 with a polarity so as to reduce the volume of the ink chamber 3, pressure of ink 10 in the ink chamber 3 is increased, thereby causing the orifice 4 to project ink droplets 12 toward a recording medium 13.

At this time, the fluid diodes 6*a* to 6*e* provided in the passages between the common ink reservoir 5 and the ink chambers 3*a* to 3*e* act to minimize the leakage of the increased pressure produced in the ink chambers 3*a* to 3*e* into the common ink reservoir 5 and to keep the increased pressure so as to be effectively applied to the orifices 4*a* to 4*e*.

Figure 2:
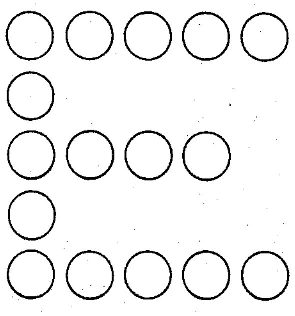
FIG. 2 is an enlarged view of an example of a character to be printed.
Figure 3:
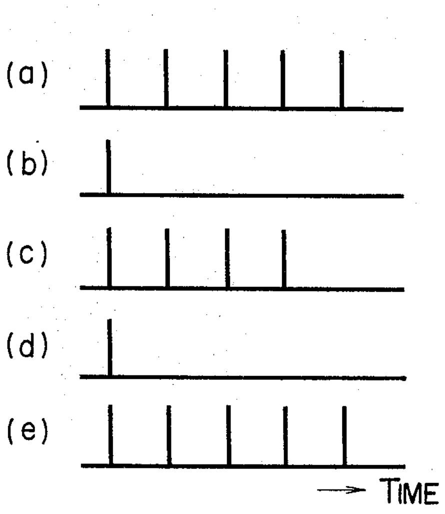
FIG. 3 is a timing diagram of voltages to be applied to the respective electrostrictive elements.

If, for example, a letter "E" is to be printed in matrix arrangement of 5×5 dots as shown in FIG. 2, drive signals as shown in FIG. 3 are applied to the electrostrictive elements 9*a* to 9*e*.

An example of the information signal source 11 for generating such drive signal voltages will be described with reference to the block diagram of FIG. 4.

Figure 5:
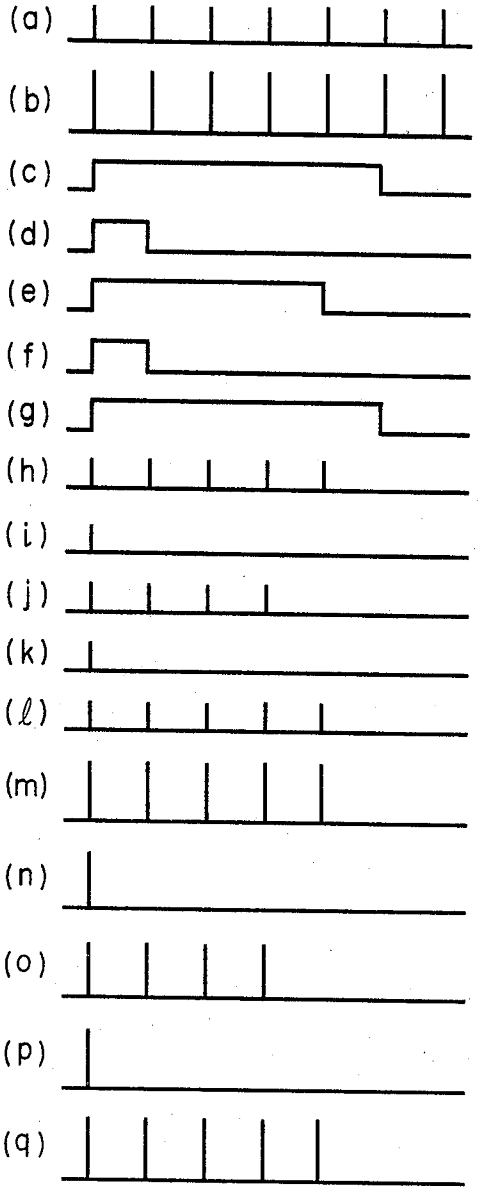
FIG. 5 is a diagram of output waveforms at various points in FIG. 4.

There is shown a clock signal generator 15 which periodically produces a pulse signal of a predetermined duration as shown in FIG. 5*a*. Shown at 16 is a character signal generator with five output terminals $O_1$ to $O_5$ from which signals shown in FIGS. 5*c* to 5*g* are produced for recording or printing a letter in 5×5 dot matrix as shown in FIG. 2.

Although the character signal generator 16 is shown to have five output terminals $O_1$ to $O_5$ for producing a character signal of 5×5 dot matrix arrangement, it will be obvious that the number of the output terminals is not limited to five.

In addition, it will be readily understood that the character signal generator 16 generally includes a character signal selector circuit (not shown) which controls the output signals from the output terminals of the generator 16 according to the letter to be printed. The structure of such character signal generator 16 is well known, as disclosed by H. Yano and M. Shioya on Article entitled "Dot-matrix character display by character signal generator" in Japanese Monthly "TRANSISTOR ENGINEERING" Jan. 1978, pages 163 to 166.

The outputs at the output terminals $O_1$ to $O_5$ of the charactor signal generator 16 are supplied to a logic circuit 17 including AND circuits 17*a* to 17*e* together with the clock signal from the clock signal generator 15. Consequently, the AND circuits 17*a* to 17*e* produce signals as shown in FIGS. 5*h* to 5*l*. The output signal (FIG. 5*a*) from the clock signal generator 15 is amplified by an amplifier 18 upto a suitable operating voltage (for example, 250 volt) for the electrostrictive elements 9*a* to 9*e* mounted onto the ink chambers 3.

Figure 6:
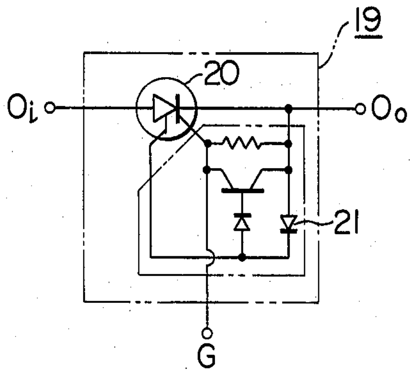
FIG. 6 is a circuit diagram showing the construction of a switching element used in the present invention.
Figure 7:
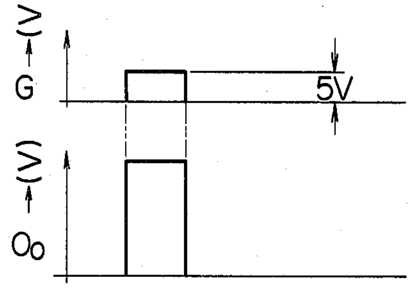
FIG. 7 is a waveform diagram of a signal for actuating the switching element.

The output voltage (FIG. 5*b*) from the amplifier 18 is supplied through semiconductor switching elements 19*a* to 19*e* to the electrostrictive elements 9*a* to 9*e*, in which case the signals from the switching elements 19*a* to 19*e* are as shown in FIGS. 5*m* to 5*g*. The semiconductor switching element 19 may be formed of a thyristor 20 and gate circuit 21 thereof as shown in FIG. 6, and commercially available as, for example, a semiconductor channel element (Hitachi's trade name: crosspoint switch). When an H level (+5 V) of two-valued voltage signal as shown in FIG. 7 is applied to a gate terminal G of the semiconductor switching element 19, a conductive path is formed between an input terminal $O_i$ and an output terminal $O_o$ so that the switching element 19 is rendered ON state, thus transmitting the signal (250 V) applied to the input terminal $O_i$ to the output terminal $O_o$.

When an L level (0 V) of the two-valued voltage signal is applied to the gate terminal G, the path between the input and output terminals $O_i$ and $O_o$ is inhibited so that the switching element 19 is rendered OFF state, thereby keeping the output terminal $O_o$ at zero potential.

The switching device 19 (19*a* to 19*e*) can be formed as one-chip integrated circuit, and therefore the output signals from the AND circuits 17*a* to 17*e* are applied to the respective gate terminals G of the integrated switching device 19 (19*a* to 19*e*), which then produces output signals (FIGS. 5*m* to 5*q*) to be supplied to the electrostrictive elements 9*a* to 9*e*.

Thus, according to one embodiment of the present invention, the control circuit including the character signal generator 16, the AND circuit 17 and the gate terminals G of the switching device 19 operates at a low voltage level corresponding to the H level of two-valued signal, and the driving circuit is arranged with the common amplifier 18 and the switching device 19 having input and output terminals for electrically interrupting the output of the amplifier 18. Therefore, the driving voltage to the electrostrictive elements 9 (9*a* to 9*e*) can be rendered ON or OFF state merely by ON-OFF control of the gate signal for the switching device 19, whereby the electrostrictive elements can operates by a control signal of low voltage level.

Moreover, only one amplifier 18 is provided commonly for all the electrostrictive elements 9*a* to 9*e* of all the nozzles and hence it is enough to adjust only the amplifier 18 for supplying equal and suitable drive voltages to the electrostrictive elements 9 of the nozzles.

For these reasons, it is unnecessary to adjust respective outputs of all the amplifiers provided individually to the respective electrostrictive elements 9 of nozzles as in the prior art apparatus, resulting in easy serviceability and shorter time for adjustment.

Moreover, the apparatus according to the invention employs, in addition to the single amplifier 18, a one-chip switching device 19 as an IC which form the drive circuits for the electrostrictive elements 9 whereas the conventional apparatus employs a plurality of amplifiers 18 for supplying high voltages (250 to 300 V) to the respective electrostrictive elements 9, so that the drive circuit system of the invention can be small-sized and the whole apparatus can be made at low cost accordingly.

In the above embodiment, the information signal source 11 supplies signals to the electrostrictive elements 9 at the same time, and thus when a number of ink chambers 3 are formed close to the single nozzle head 1 as shown in FIG. 1, the vibration of the electrostrictive elements 9 at the ink chambers 3 may exert influence on each other, that is, a so-called mutual interference may occur.

Figure 8:
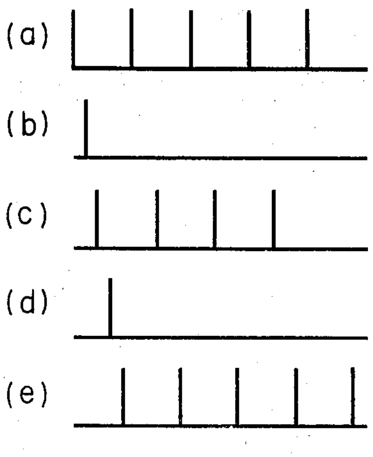
FIG. 8 is a timing diagram of applied voltages to electrostrictive elements in another embodiment of the present invention.

In such a case, the driving voltages or information signals to be applied to the electrostrictive elements 9 which are provided to oppose the respective ink chambers (pressure chambers) 3 are sequentially scanned as shown in FIG. 8 so that two or more electrostrictive elements 9 are not driven at the same time.

Figure 4:
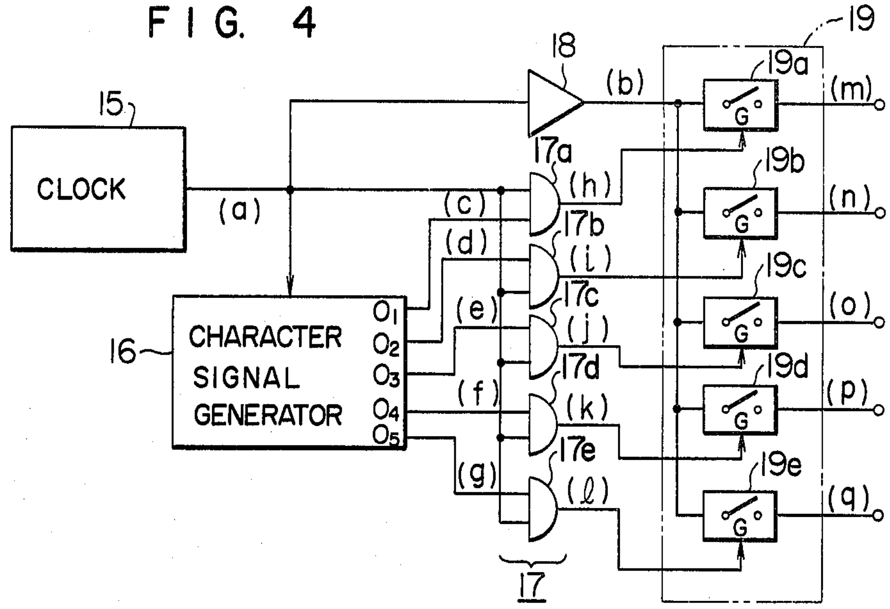
FIG. 4 is a block diagram of an embodiment of the apparatus of the present invention.

For the sequential scanning, shift registers, for example, must be placed before the respective AND circuits 17 in FIG. 4 so as to shift the output signals from the AND circuits 17*a* to 17*e* in sequence as shown in FIG. 8.

If such registers are used, the output signals from the AND circuits 17 applied to the gate terminals of the switching devices 19 are sequentially phase-shifted, so that the signal voltages applied to the electrostrictive elements 9 are also phase-shifted as shown in FIG. 8.

Thus, since the output voltages from the switching devices 19 can be made different in phase, the mutual interference as described above can be prevented effectively.

As described in the first and second embodiments, information signals are applied to the electrostrictive elements 9 only when recording or printing is desired.

This ink-jet printing apparatus, however, utilizes mechanical vibration (change of the volume of ink chambers) for projection of ink droplets, and therefore the optimum voltages to be applied to the electrostrictive elements 9 are within a certain voltage range, for example 170 to 250 volts. If the value of the applied voltage is too high, abnormal vibration takes place, causing very small ink drops (generally called satellite drops) along with desired ink drops. As a result, clear printing or recording sometimes cannot be attained. Moreover, regular application of signal voltages to the nozzle will provide stable projection of ink droplets, but sporadic application of signal voltages to the nozzle may sometimes cause abnormal generation of ink droplets from the nozzle (or orifices). This is because the fluid resistances in the ink chambers and orifices are high against the sporadic application of signal voltages to the nozzle, so that ink does not immediately respond to the application of the first information signal subsequent to a period of non-printing conditions.

Thus, if a low-voltage signal by which no ink drops can be projected from the orifices is always applied to the electrostrictive elements even when printing is not performed or undesired, the frequency-response characteristics of the nozzle can be improved.

Figure 9:
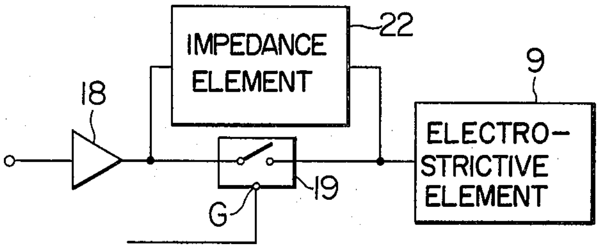
FIG. 9 is a circuit diagram of a switching element section in still another embodiment of the present invention.

FIG. 9 shows another embodiment of the invention for improving the frequency-response characteristics of the nozzle, which illustrates only the part corresponding to the switching device 19*a* in FIG. 4.

In FIG. 9, there is shown an impedance element 22 (for example, resistor, capacitor or the like) which is connected in parallel with the switching element 19 and selected to have an impedance value equal to or higher than the impedance of the electrostrictive element 9.

When the switching element 19 is in the OFF state, the electrostrictive element 9 is supplied with a voltage determined by the ratio of the impedence of the electrostrictive element to that of the impedance element 22.

When the output signal from the AND circuit 17 is applied to the gate terminal G of the switching element 19, thereby making the element 19 conductive, the output of the amplifier 18 is substantially wholely applied to the electrostrictive element 9 because the impedance element 22 is short-circuited by this switching element 19.

Figure 10:
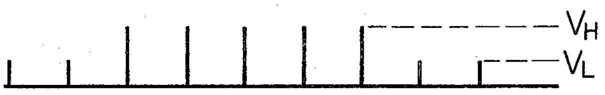
FIG. 10 is a waveform diagram of an applied voltage to the electrostrictive element.

Thus, the voltage applied to the electrostrictive element 9, as shown by FIG. 10, is at a level $V_H$ necessary for recording when the switching element 19 is turned on and a level $V_L$ when recording is not necessary.

The voltage $V_L$ is frequently applied at non-recording to the electrostrictive element 9 and excites it to the extent that the ink drop 12 is not projected from the orifice 4. Therefore, the sudden change in level of the voltage applied to the electrostrictive element 9 is prevented thereby preventing abnormal vibration of nozzle.

In addition, the frequency-response characteristics of the nozzle can be extensively improved so as to increase the upper limit of the optimum frequency range by twice. This is equivalent to increase in the recording speed of the recording or printing apparatus by about twice the normal maximum speed.

The signal voltage $V_H$ at recording and the voltage $V_L$ at non-recording are dependent on the physical characteristics (surface tension, viscosity and others) of ink used. If, for example, $V_H$ is 250 volts, $V_L$ of about 100 volts is sufficient. Thus, it will be satisfactory that the value of the impedance element 22 connected in parallel with the switching element 19 is selected to be about 1.5 times the impedance value of the electrostrictive element 9.

While in the above embodiment the output of the single amplifier 18 is applied through the switching element 19 to the five electrostrictive elements 9*a* to 9*e*, it is sometimes required that the ink-jet printing apparatus have a plurality of nozzle heads 1 each including a plurality of ink chambers 3.

In this case there are provided plural sets, each including an amplifier, a plurality of electrostrictive elements and a set of switching elements opposing thereto, the switching elements being individually controlled by applying information signals to the respective gates.

Instead of using one switching element 19 for one electrostrictive element 9, two or more electrostrictive elements may be connected to the output of a single switching element 19 and driven simultaneously by the same signal voltage.

With this arrangement, the printing of the same picture element can be performed by two or more ink drops, which is particularly useful for printing of, for example, a thick letter.

While, in the above embodiment, ink droplets required for printing are projected by changing the volumes of a plurality of ink chambers which are provided at the nozzle head, the present invention is not limited to such arrangement.

In the charge modulation system, a plurality of nozzles may be provided in parallel and the voltages for selectively projecting ink drops required for recording may be applied through a common amplifier to the charge electrodes provided to oppose the respective nozzles in which case the signal voltage to each nozzle can be controlled through a switching device the gate of which is supplied with an information signal as described in the preceding embodiment.

Another embodiment of the present invention will hereinafter be described with reference to FIGS. 11 and 12.

Figure 11:
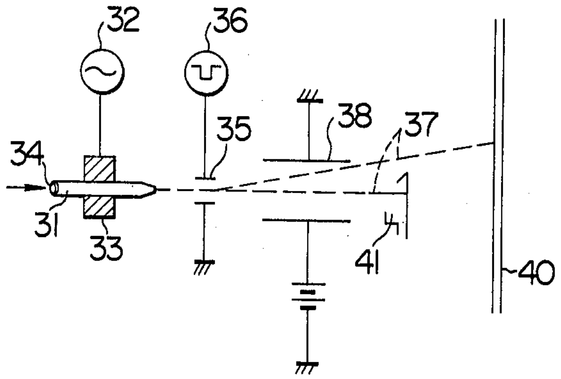
FIGS. 11 and 12 are explanatory diagrams for showing a schematical construction of a charge modulation system in further embodiment of the invention.

Referring to FIG. 11, there is shown a nozzle 31 on which is mounted an electrostrictive element 33 which is excited by a high-frequency power supply 32. A plurality of (for example, three) nozzles 31A, 31B, and 31C are provided as shown in FIG. 12 and each supplied with an ink 34 under pressure of about 2 to 4 kg/cm$^2$.

The inks 34 may be of, for example, different colors of red R, green G and blue B.

Shown at 35 is a charge electrode which is disposed in the neighbourhood of the tip end of the nozzle 31 and to which a predetermined voltage is selectively applied from an information signal source 36. An ink drop 37 charged by the charge electrode 35 is deflected during passing through a deflection electrode 38 and deposited onto a recording or printing paper sheet 40 placed on a drum 39.

At this time, ink drops 37 subjected to no electric charge by the charge electrode 35 are collected individually by a gutter 41.

Figure 12:
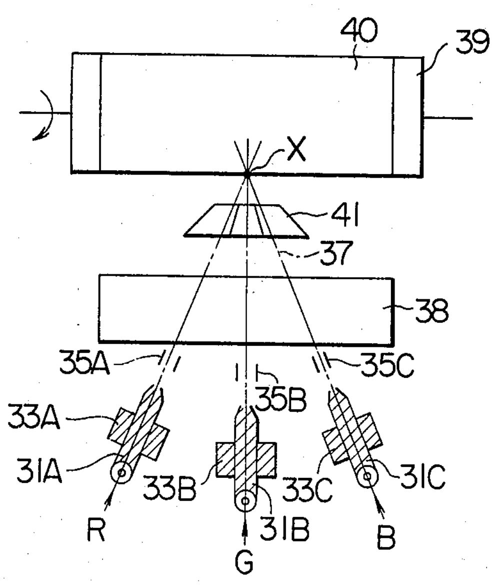

The nozzle 31, charge electrode 35 and gutter 41 are provided for each color ink, and the color ink droplets 37 projected from the nozzles 31A to 31C upon being charged by the charge electrodes 35A, 35G and 35B are deflected by the deflection electrode 38 at predetermined angles so as to be focussed at a point X on the printing or recording paper sheet 40 as shown in FIG. 12.

With the above-mentioned arrangement, the nozzles 31A to 31C project ink droplets 37 of a uniform size in synchronism with the frequency of a voltage which the high-frequency power supply 32 feeds to the electrostrictive elements 33.

Of the projected ink droplets, only ink drops to be used for printing are charged by the charge electrodes 35.

Thus, an information signal from the information signal source 36 is applied to the electrodes 35 thereby to control color ink drops 37 so as to deposit onto the printing paper sheet 40 and print a desired color picture.

To this end, the charge electrodes 35A to 35C provided to the respective nozzles 31A to 31C are connected through the switching devices 19 to the common amplifier 18 in which case the three switching elements 19 are provided opposing to the charge electrodes 35A to 35C. To the gates G of the switching elements 19 are supplied from a signal source (not shown) information signals (for example, color printing signals) in place of the letter signal in the preceding embodiment.

Therefore, of the ink drops projected from the nozzles 31A to 31C, only those to be used for printing are controlled at a suitable charged condition so as to effect a desired color image on the recording paper sheet 40.

Moreover, the above-mentioned charge modulation system is not necessarily limited to color printing, but can be used to control the tone of monochromatic printing by focussing onto the point X monocolor ink drops projected from a plurality of nozzles and controlling the number of the ink drops used for printing.

In the multinozzle ink jet printing apparatus according to the invention in which a plurality of nozzles individually project ink drops necessary for printing, means for causing projection of the ink drops necessary for printing in accordance with information signals are driven by a common power source, the output of which is selectively controlled by a switching means which is controlled by the information signal. Thus, since the switching means can be turned on or off with a low level of control voltage, it is possible to control the ink drops to be projected effectively from a number of nozzles in response to the low control voltage.

Moreover, since the common power source is used to supply drive voltages to the means for causing projection of ink drops from a number of nozzles, it is very easy to adjust the voltage to each nozzle.

Furthermore, the common power source and the switching means constitute a drive system which drives the means for causing projection of ink drops from each nozzle, so that the drive system can be small-sized, resulting in a small size of the entire apparatus.

It will be apparent that many modifications and variations may be effected without departing from the scope of the novel concepts of this invention.

We claim:

1. An ink-jet printing apparatus which is arranged such that a plurality of nozzles for projecting ink droplets are provided and the ink droplets projected therefrom are selectively deposited on a recording medium in accordance with an information signal so as to form a desired printed pattern, said ink-jet printing apparatus comprising:

a plurality of ink chambers defining pressure chambers;

orifices communicating with said ink chambers;

electromechanical transducers provided opposing to said ink chambers;

a common power source connected to said electromechanical transducers through respective switching means which are individually rendered conductive or non-conductive by said information signal, the volumes of said ink chambers being changed respectively by application of electrical signals to said electromechanical transducers, thereby causing ink droplets of desired size to project from the ink chambers, said switching means serving to selectively supply the output of said power source to each of said electromechanical transducers; and an impedance element connected in parallel with each of said switching means between said common power source and each of said electromechanical transducers and having an impedance value equal to or larger than the impedance of the associated electromechanical transducer, so as to supply an electrical signal of low voltage to each electromechanical transducer when the associated switching means is non-conductive without causing ink droplets to be generated at that time.

2. An ink-jet printing apparatus according to claim 1 wherein said switching means includes semiconductor switching elements having gates which are controllable to interrupt output signals in response to said information signal applied to the gates thereof.

3. An ink-jet printing apparatus according to claim 1 wherein said switching means connected to each of said electromechanical transducers is arranged such that said electromechanical transducers provided to said ink chambers are scanned through the semiconductor switching elements.

4. An ink-jet printing apparatus according to claim 1 wherein at least two of said electromechanical transducers are connected to the output end of each of said switching means and said electromechanical transducers are simultaneously driven by the same signal voltage.

* * * * *